United States Patent

Rosen et al.

[15] 3,676,642

[45] July 11, 1972

[54] MODULAR APPARATUS FOR HEATING CIRCULATING COATING MATERIAL

[72] Inventors: Samuel R. Rosen, Lorain; Alvin A. Rood, Westlake; Donald R. Scharf, Amherst, all of Ohio

[73] Assignee: Nordson Corporation, Amherst, Ohio

[22] Filed: April 17, 1970

[21] Appl. No.: 29,409

[52] U.S. Cl. ..........................219/301, 29/157.3 R, 165/168, 219/308
[51] Int. Cl. .........................................H05b 3/04, H05b 3/70
[58] Field of Search ...............29/157.3 A, 157.3 B, 157.3 R, 29/157.3 V, 417; 165/150, 161, 168, 170, 171, 174; 219/296–309

[56] References Cited

UNITED STATES PATENTS

| 2,833,909 | 5/1958 | Levey | 219/302 X |
| 2,955,184 | 10/1960 | Grinrod | 219/302 UX |
| 1,418,011 | 5/1922 | Mehn | 219/301 X |
| 1,523,156 | 1/1925 | Adams | 219/305 |
| 1,929,824 | 10/1933 | Polley | 165/168 |
| 3,110,754 | 11/1963 | Witort et al. | 29/157.3 R UX |
| 3,208,261 | 9/1965 | Pasternak | 29/157.3 B X |

FOREIGN PATENTS OR APPLICATIONS

| 1,057,148 | 5/1959 | Germany | 165/174 |

*Primary Examiner*—R. F. Staubly
*Attorney*—Bosworth, Sessions, Herrstrom & Cain

[57] ABSTRACT

A modular apparatus for heating circulating liquids such as paint. The apparatus has a heater module that may be heated internally to a high temperature by electrical energy for example, and one or more interchangeable circuit modules having a relatively high thermal conductivity and positioned face to face against the heater module in heat transfer relationship therewith. Each circuit module has a group of generally parallel internal passages formed for example during extrusion and interconnected in pairs at their ends so as to define a sinuous circuit for liquid between inlet and outlet ports. One circuit module may be secured on each opposite face of the heater module with the two respective groups of passages interconnected through the interposed heater module to form a continuous series connection between the two circuit modules. Two or more such units may be ganged with a series circuit connection to enlarge the circuit and increase the volumetric capacity.

4 Claims, 5 Drawing Figures

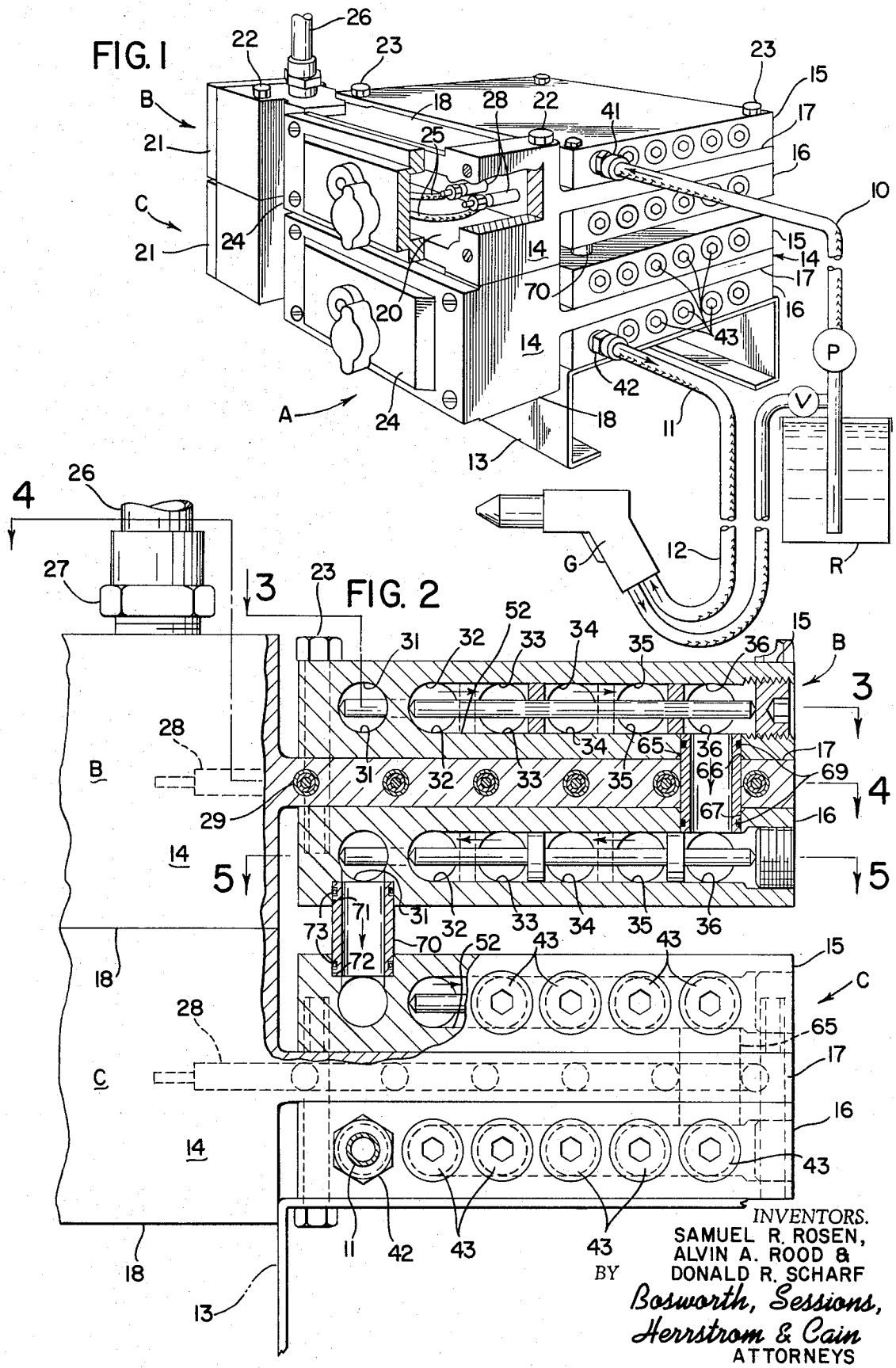

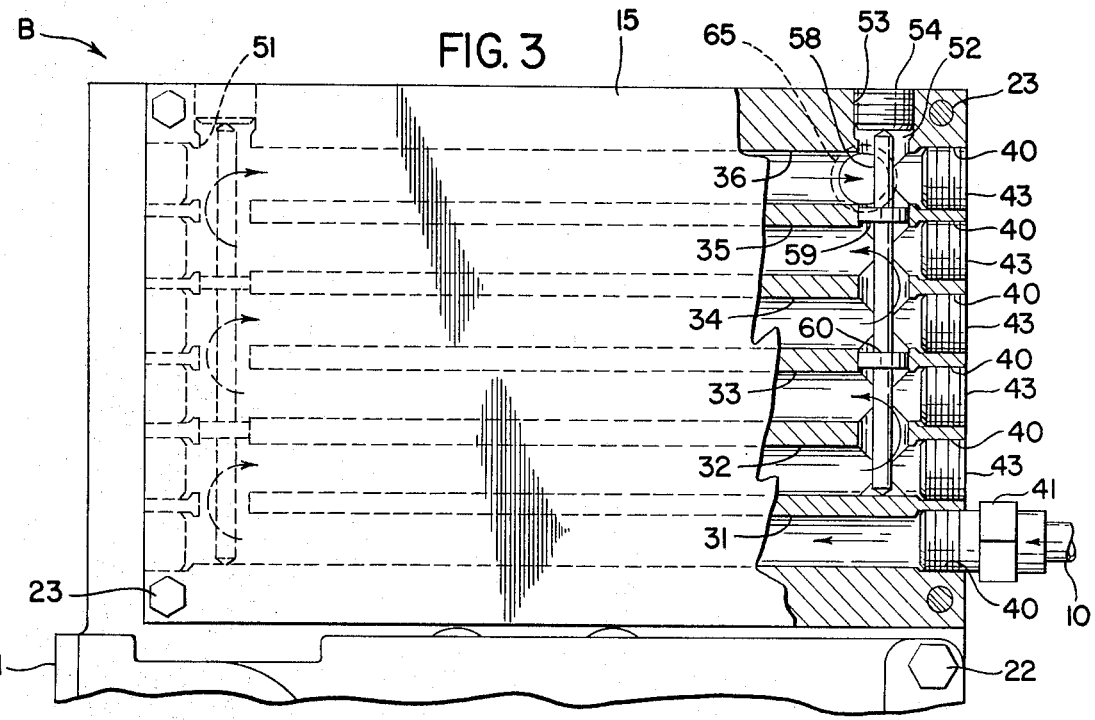
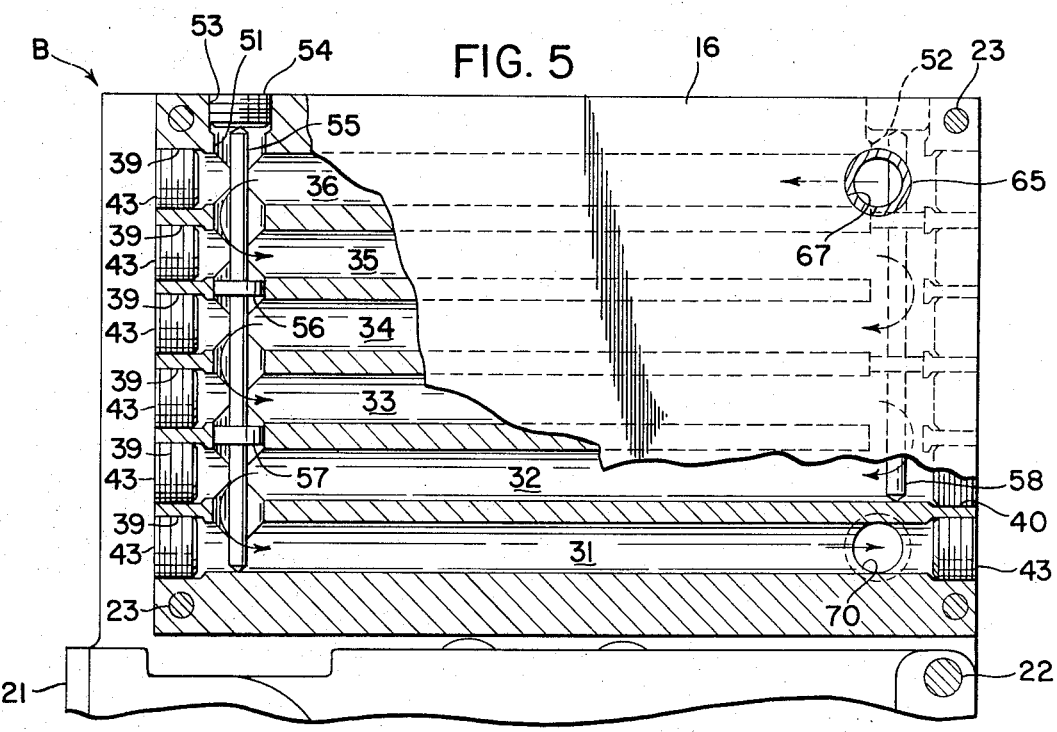

MODULAR APPARATUS FOR HEATING CIRCULATING COATING MATERIAL

BACKGROUND OF THE INVENTION

This invention relates to apparatus for heating circulating liquids such as paint, and especially to heaters of the general type patented in U.S. Pat. No. 3,175,075 of Mar. 23, 1965. More particularly our invention relates to an improvement upon the paint heater of U.S. Pat. No. 3,175,075 which improvement reduces the cost of construction, facilitates repair and reduces periodic cleaning.

While our invention has utility in the broad aspect of heating circulating fluids generally, it is directed particularly to solving the problems incident to and associated with the heating of paint to reduce its viscosity so that it may be applied by spraying, especially when the spraying is done by the airless method of U.S. Pat. No. 2,754,228. 228.

For the purpose of describing our invention we will use the word "paint" to comprehend liquid coating and finishing materials generally, and to include inter alia enamels, emulsions, catalyzed resins, mastics and asphaltums, waxes and paraffins, oils and lubricants, lacquers, plastisols, adhesives and other specialty coatings.

Prior to our invention heaters for heating circulating paint to reduce its viscosity have utilized a unitary body of cast metal with a high thermal conductivity, such as aluminum, to provide a network of enclosed interconnected passages providing a series circuit for the paint, of sufficient length to enable the paint passing therethrough to be heated to the desired temperature by heat transfer from the heated mass of the unitary body. Normally the body has been heated with electrical energy such as for example by a "CALROD" coil embedded within the body.

While such unitary paint heaters accomplish the desired purpose they tend to leak under certain operating conditions. Cast metal is usually inherently porous due to air inclusion and as a result leakage of paint may occur when the paint within the cast metal body is being circulated at relatively high pressure. Accordingly cast heater blocks must have their paint passages treated to seal the pores. This may be accomplished for example by soaking the cast block in a pressurized liquid bath of a sealing material such as sodium silicate. If a perfect sealing is not achieved the heater body will leak at the high paint pressures and temperatures that are present during certain types of operation. As disclosed in U.S. Pat. No. 3,175,075 working pressures of paint are up to about 1,000 pounds per square inch.

Accordingly since perfect sealing of the paint passages is difficult to achieve cast blocks are undesirable for high paint pressure and temperature conditions. Also the sealing process adds substantially to the cost of manufacture.

Also, in many instances the paint passages in the heater body may become clogged with solidified paint due to infrequent or improper cleaning. This necessitates replacement of the entire unit long before the useful life of the body and associated parts has expired. This repair requires purchasing an entirely new body with integral heating elements etc. all of which is costly and inconvenient.

The modular heat exchanger of the present invention however reduces the difficulties indicated above and affords other features and advantages heretofore not obtainable.

SUMMARY OF THE INVENTION

It is among the objects of the invention to provide an alternative to the use of cast metal heat transfer bodies in apparatus for heating circulating paint.

Another object is to reduce the average time required to manufacture heat transfer bodies with the required integrity for apparatus for heating circulating paint.

A further object is to provide an apparatus for heating circulating paint, which may be more quickly repaired when the passages of the paint circuit become clogged.

Still another object is to provide a modular heat transfer apparatus for heating circulating paint wherein the portions that comprise the paint circuit may be easily replaced independently of the other operating parts of the apparatus to reduce the time required for repair and to enable such portions to be replaced by others of a different material such as stainless steel and other non-corroding metal.

A still further object is to provide an apparatus for heating circulating paint wherein higher paint pressures may be accommodated without leakage.

These and other objects and advantages are accomplished by means of a modular apparatus for heating circulating paint comprising a heater module and at least one circuit module located face to face in heat transfer relationship with the heater module. The circuit module has a paint inlet port and a paint outlet port and means defining a sinuous circuit for paint therewithin between the ports.

According to the preferred embodiment, the circuit comprises a group of parallel passages extending through the circuit module and including an inlet passage at one side of the group communicating with an inlet port and an outlet passage at the opposite side of the group communicating with the outlet port. The ends of the passages other than those ends that comprise the inlet and outlet ports are closed such as by threaded plugs. Two transverse bores are machined in the circuit module, one bore at each end of the group of passages and each bore intersecting certain of the passages. The bores are both closed such as by threaded plugs and one or more partitions are positioned in each bore to block the respective bore between certain passages in such a way as to define closed connecting ways only between adjacent pairs of the longitudinal passages whereby paint travels from the inlet port to the outlet port through successive passages progressively in a sinuous path of travel or circuit and is thus heated by heat transfer from the heater module.

According to the preferred form of the invention the circuit module is a rectangular block cut from a relatively long length of extruded metal with internal longitudinal holes, each block being cut from the extrusion in a direction generally perpendicular to the longitudinal holes. The extrusion process produces a product in the case of aluminum, that is essentially free from pores of the type that are generally present in aluminum castings.

Also according to the preferred form one such circuit module is located face to face on each opposed face of the heater module to form a sandwich type assembly.

BRIEF DESCRIPTION OF THE DRAWINGS

FIG. 1 is a perspective view of a modular apparatus for heating circulating paint, embodying the invention and used in an airless paint spraying system, other equipment of the system being shown schematically;

FIG. 2 is a side elevation of the apparatus of FIG. 1 drawn to a larger scale and with parts broken away and shown in section for the purpose of illustration;

FIG. 3 is a fragmentary horizontal section taken on the line 3—3 of FIG. 2;

FIG. 5 is a fragmentary horizontal section taken on the line 5—5 of FIG. 2.

DESCRIPTION OF THE PREFERRED EMBODIMENT

Figure 4:
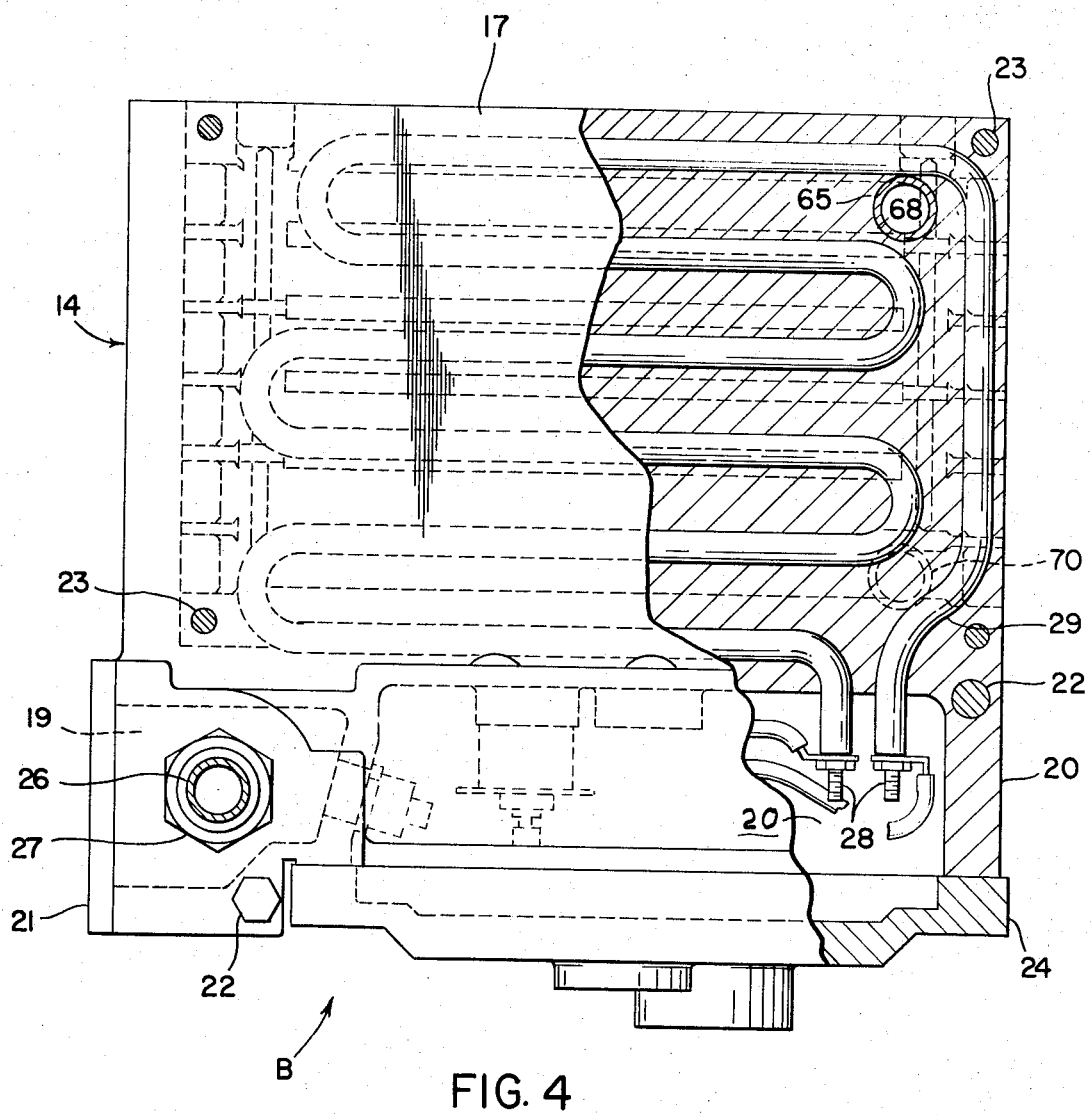
FIG. 4 is a horizontal section taken on the line 4—4 of FIG. 2.

Referring more particularly to the drawings, FIG. 1 shows a heating apparatus A embodying the invention, for heating circulating paint in an airless paint spraying system and two heater units B and C, fastened together in ganged or stacked relationship with their respective paint circuits connected in series. This arrangement provides a much higher volumetric capacity than could be handled by only one of the heater units B and C. It will be understood that in certain instances only one heater unit B or C will be needed and also that under different circumstances three or more heater units might be required. The airless spray painting system in which the heating apparatus A is used is indicated schematically in FIG. 1 and includes a paint reservoir R, a pump P located between the reservoir and the heater A, an airless spray gun G which receives heated paint from the heater A, and a control valve V connected between the supply and return lines from the reservoir R.

In the system shown heated paint is circulated continuously through the spray gun G for the purpose of maintaining uniformity of paint temperature and thus of paint viscosity. Also the system shown embodies the "airless" method of spray painting of U.S. Pat. No. 2,754,228 and the particular spray gun may be for example one of the guns disclosed in U.S. Pat. Nos. 2,936,959 and 3,116,020.

The pump P may be for example a double acting piston type pump of the type shown and described in U.S. Pat. application, Ser. No. 809,235, now U.S. Pat. No. 3,635,125, granted Jan. 18, 1972. Paint is delivered by the pump P to the heater unit B through a paint inlet line 10 and then from the heater unit C to the airless spray gun G through an outlet line 11. From the gun G the heated paint is delivered to the control valve V through a return line 12 for recirculation. The units B and C of the apparatus A are supported in stacked relation on a base 13.

Since the two heat exchangers B and C are alike in all respects other than the particular location of the various fluid fittings to satisfy the particular application illustrated and described herein, this description will be limited primarily to the heater unit B, and like numerals will be used to identify like parts in both heater units B and C. As will more fully appear below each of the units B and C has appropriate electrical means to be a self-sufficient, separately controlled and independently operable unit on the one hand and on the other hand is formed and constructed to have a facility for being operatively associated and combined with similar units to form and comprise a multiple unit, paint heating apparatus functioning as an integrated unit.

The heater unit B is of modular construction and comprises a heater module 14, an upper circuit module 15 and a lower circuit module 16. The heater module 14 has a flat heating plate portion 17 interposed or sandwiched between the upper and lower circuit modules 15 and 16 respectively so as to be in heat exchange relationship with both circuit modules. A conductive coating material is applied to the adjacent faces of the respective modules 14, 15 and 16 to improve heat transfer and eliminate air gaps. Such material may be graphite crystals that are applied in the form of a suspension, such as a product sold under the trade designation "DYLON (Grade AE)" made and sold by Dylon Industries of 14430 Indian Creek Rd., Cleveland, Ohio. This product has a high thermal and electrical conductivity and will not contaminate most non-ferrous metals.

The heater module 14 is formed for example of aluminum such as by die casting, sand casting or permanent mold casting. While aluminum is the preferred material, it will be understood that other materials such as copper, silver, magnesium and their various alloys may be used to advantage. Also the aluminum may be hard anodized or otherwise plated to reduce corrosion etc. The module 14 has an enlarged casing portion 18 at one end thereof, the left hand end as viewed in FIG. 2. The faces of the plate portion 17 are machined to a smooth finish to provide for good heat transfer. The casing portion 18 defines both a junction closure 19 for the interior and exterior power lines, and an explosion proof chamber 20 for manually and thermostatically actuated switches.

The heater units B and C are secured to one another by two bolts 22 extending through mating holes in each of the casings 18. The respective modules 14, 15 and 16 of each unit B and C are fastened together by bolts 23 extending through the upper and lower circuit modules 15 and 16 and interposed heating plate portion 17.

The junction closure 19 and chamber 20 of each heater module 14 are covered by closure plates 21 and 24 respectively and electrical lead wires 25 enter the closure 19 through an armored electrical conduit 26 secured to a conventional fitting 27 in the casing of the heater unit B. The lead wires 25 are connected to terminals 28 for an electrical heating coil 29 which is cast into and thus embedded in each of the heating plates 17 (See FIG. 4). The coil 29 is preferably cast into the middle interior of the heating plate portion 17 with its various spans symmetrically related and largely parallel to one another. The coil is preferably intimately bonded to the surrounding metal for efficient transmission of heat and with thermal symmetry for uniform diffusion of heat through both the heating plate 17 and the adjacent circuit modules 15 and 16. The coil 29 is formed for example of Nichrome or other suitable high resistance conductor material supported in ceramic powder within a low carbon steel sheath. This construction lends itself advantageously to the purposes and operations of the invention.

The circuit modules 15 and 16 are of generally flat rectangular form and comprise a material preferably having a high thermal conductivity such as aluminum or an aluminum alloy. Other materials such as copper, silver, magnesium and their various alloys might be used as well, however aluminum or an aluminum alloy is preferred. A particular advantage of the invention is that it permits the circuit modules to be formed by an extrusion process rather than by casting. The extrusion process when combined with certain required machining provides relatively impermeable metal surfaces as opposed to the porous surfaces which generally result from casting. Thus the procedure for impregnating the porous surfaces with a sealing material can be eliminated. The circuit modules are able to withstand the working pressures of the circulating paint which may be up to about 1,000 pounds per square inch.

The modules 15 and 16 may be cut from a long extruded strip, the extrusion being provided with a plurality of internal passages, in the present instance six passages, of cylindrical form, indicated by the numerals 31 through 36. Since the upper circuit module 15 is essentially identical to the lower circuit module 16 other than with respect to the location of certain fittings, like numerals will be used to identify the corresponding passages 31 to 36 in each case. The passages 31 to 36 extend entirely through the modules 15 and 16 but are each provided with a tapped portion 39 at one end and another tapped portion 40 at the other end FIGS. 3 and 5). The tapped portion 40 of the passage 31 of the upper circuit module 15 of the unit B is provided with a threaded inlet fitting 41 for the inlet line 10, and the tapped portion 40 of the passage 31 for the lower circuit module 16 of the unit C is provided with a threaded outlet fitting 42 for the outlet line 11. All of the other tapped portions 39 and 40 are closed with threaded plugs 43.

Extending laterally through the circuit modules 15 and 16 perpendicular to the passages 31 through 36, are two transverse bores 51 and 52 (FIGS. 2, 3 and 5) the bore 51 being formed at the left hand end and the bore 52 being formed in the right hand end as viewed in FIG. 3. The bore 51 intersects the passages 31 through 36 while the bore 52 is somewhat shorter and intersects only the passages 32 to 36. The open end of each bore 51 and 52 is tapped as indicated at 53 and receives a threaded plug 54 that seals and blocks the respective bores 51 and 52.

Located within the bore 51 is a spacer rod 55 closely positioned between the wall of the passage 32 in which the bore 51 terminates and the interior end of the plug 54. The spacer rod 55 carries two cylindrical partitions 56 and 57 that fit closely against the walls of the bore 51 and are secured to the rod 55. The partitions 56 and 57 are so located that the partition 56 essentially seals the passage 34 from the passage 35 while the partition 57 likewise essentially seals the passage 32 from the passage 33.

Another spacer rod 58 of shorter length is located in the bore 52 in the same manner and carries two cylindrical partitions 59 and 60, the partition 59 essentially sealing the passage 35 from the passage 36 and the partition 60 likewise essentially sealing the passage 33 from the passage 34. The partitions 56, 57, 59 and 60 need not provide a tight seal but merely serve the purpose of providing sufficient blockage to essentially limit the flow of paint through the passages 31 to 36 to a desired sinuous series circuit.

It will be seen that the function of the spacer rods 55, 58 and partitions 56, 57, 59 and 60 is to define end connections between selected pairs of passages 31 to 36 such that in the case of the upper circuit module 15 paint entering through the fitting 41 travels in a sinuous progressive path from the passage 31 successively to the passage 36. At the right hand end of the passage 36 as viewed in FIG. 3 the paint passes through a connector tube 65 to the corresponding passage 36 of the lower circuit module 16 so that the right hand ends of the two passages 36 of the respective circuit modules 15 and 16 are connected in series. The connector tube 65 is seated in matching bores 66 and 67 in the two circuit modules 15 and 16 respectively and extends through a matching bore 68 formed in the heater module 14. The connector tube is sealed relative to the two circuit modules 15 and 16 by means of annular rubber O-ring seals 69. Referring to FIG. 5 it will be seen that the liquid paint passes through the lower circuit module 16 in a reverse manner from the passage 36 to the passage 31.

At the right hand end of the passage 31 as viewed in FIG. 5 is a connector tube 70 which is positioned between a bore 71 formed in the bottom of the lower circuit module 16 of the heater unit B and a matching corresponding bore 72 formed in the top surface of the upper circuit module 15 of the bottom heater unit C. The tube 70 is sealed by means of O-ring seals 73. From the tube 70 the paint proceeds in like manner through the portion of the circuit defined by the passages 31 to 36 in the upper circuit module 15 and lower circuit module 16 of the bottom heater unit C, and subsequently into the outlet tube 11 through the outlet fitting 42 which is threaded into the threaded counterbore 40 of the respective passage 31. Thus paint flows through the respective passages 31 to 36 of the blocks 15 and 16 in series, diversing back and forth from end to end in a horizontal plane above and below the respective heating coils 29.

The series circuit gives advantageous heat transfer and minimum stratification, separation and sedimentation. The heat energy provided for the purpose of heat transfer to the paint should be sufficient to raise the temperature of the paint from room temperature to about 170° F., the respective heating coils 29 having about 2,000 watts capacity. As suggested above the present construction permits use of the heater units B and C to meet a great variety of requirements particularly with respect to volumetric capacity. Thus the units B and C may be stacked one above the other with their paint circuits connected in series as disclosed, to satisfy the needs of the specific application.

Also it will be apparent that because of the modular construction of each heater unit B and C it is possible to effect repair merely by replacing one or both of the relatively inexpensive circuit modules 15 and 16. In most instances it will be more convenient to replace circuit modules rather than attempt to clean them when in place by removing the various plugs 43. However, the circuit modules may be conveniently reconditioned after they have been replaced by removing the various plugs and spacer rods and using appropriate tools to clean out both the passages 31 to 36 and the transverse bores.

A principal advantage of the present construction of the circuit modules is that they may be cut from relatively long extruded blanks and then fabricated merely by boring and tapping the respective transverse bores and the bores for the interconnection of the circuit modules with one another.

In some circumstances it may be desirable to use circuit modules formed of stainless steel such as where the coating material to be sprayed may react with aluminum. Where this occurs the extruded aluminum circuit modules 15 and 16 may simply be replaced with the stainless steel modules by the procedure described above. The stainless steel modules of course must be formed primarily by machining or casting rather than by extrusion, however, the construction of the invention readily lends itself to machining operations.

While the invention has been shown and described with respect to a specific embodiment thereof this is intended for the purpose of illustration rather than limitation and other variations and modifications will be apparent to those skilled in the art upon a reading of the specification and claims. Accordingly the patent is not to be limited in any way that is inconsistent with the extent to which the progress in the art has been advanced by the invention.

We claim:

1. A modular apparatus for heating coating material circulated therethrough under pressure comprising a heater module containing means for generating and controlling heat and including a plate having two opposite flat surfaces, a pair of circuit modules removably secured to said plate on opposite sides thereof and positioned in heat transfer relationship therewith, each of said circuit modules defining a sinuous circuit for coating material including a plurality of parallel passages extending through each circuit module, one of the outermost passages being an inlet passage and having an inlet port at one end, and the other outermost passage being an outlet passage and having an outlet port at one end, intermediate passages between said inlet and outlet passages, removable plug means closing each end of each passage between said ports, two transverse bores in said circuit module, one bore adjacent each end of said passages and each bore intersecting said passages and being closed at each end, removable restriction means in each bore blocking the respective bore between adjacent pairs of passages to define closed connecting ways between other adjacent pairs of passages, whereby said coating material can circulate from said inlet port to said outlet port to be heated by heat transfer from said plate, and a connector tube extending through said plate and connecting said respective circuits in said circuit modules in series to define a single continuous plural heating circuit having an inlet in one of said circuit modules and an outlet in the other of said circuit modules, said connector tube communicating between the ends of said respective circuits opposite said inlet and said outlet.

2. A modular apparatus for heating coating material circulated therethrough under pressure comprising a heater module containing means for generating and controlling heat and at least one removable circuit module positioned in heat transfer relationship with said heater module and defining a sinuous circuit for coating material, said circuit including a plurality of parallel passages extending through said circuit module, one of the outermost passages being an inlet passage and having an inlet port at one end, and the other outermost passage being an outlet passage and having an outlet port at one end, intermediate passages between said inlet and outlet passages, plug means closing each end of each passage between said ports, two transverse bores in said circuit module, one bore adjacent each end of said passages and each bore intersecting said passages, each bore terminating at one end in a wall of said circuit module, a plug closing each of said bores at its other end, restriction means in each bore blocking the respective bore between adjacent pairs of passages to define closed connecting ways between other adjacent pairs of passages, said restriction means comprising a spacer rod axially aligned in said bore with its opposite ends engaged by said wall and the plug for its respective bore, and spaced cylindrical partitions mounted on said rod to block said bore between adjacent pairs of passages, to define with the walls of said bore said closed connecting ways, whereby said coating material can circulate from said inlet port to said outlet port to be heated by heat transfer from said heater module.

3. A modular apparatus as claimed in claim 2 wherein said plug means, said plugs and said restriction means are removable.

4. A modular apparatus for heating coating material circulated therethrough under pressure comprising a heater module having essentially all the means for generating and controlling heat including a heat transfer plate having two opposite flat surfaces and a laterally disposed support structure for said heat transfer plate, a pair of circuit modules distinct from said heater module and mounted on opposite sides of said plate in heat transfer relationship therewith so as to be readily removable from said heater module, said circuit modules having essentially all the means for containing said coating material and being formed so as to be substantially nonporous to said coating material, and a connector tube extending through said plate and connecting said circuit modules in series to define a single continuous heating path for said coating material having an inlet in one of said circuit modules and an outlet in the other of said circuit modules, said connector tube communicating between the ends of said path in the respective circuit modules opposite said inlet and said outlet, said laterilly disposed support structure being constructed and arranged for co-operating with at least one similar support structure, whereby it may be assembled therewith in stacked relationship for incorporating at least one additional circuit module in stacked arrangement.

* * * * *